UNITED STATES PATENT OFFICE.

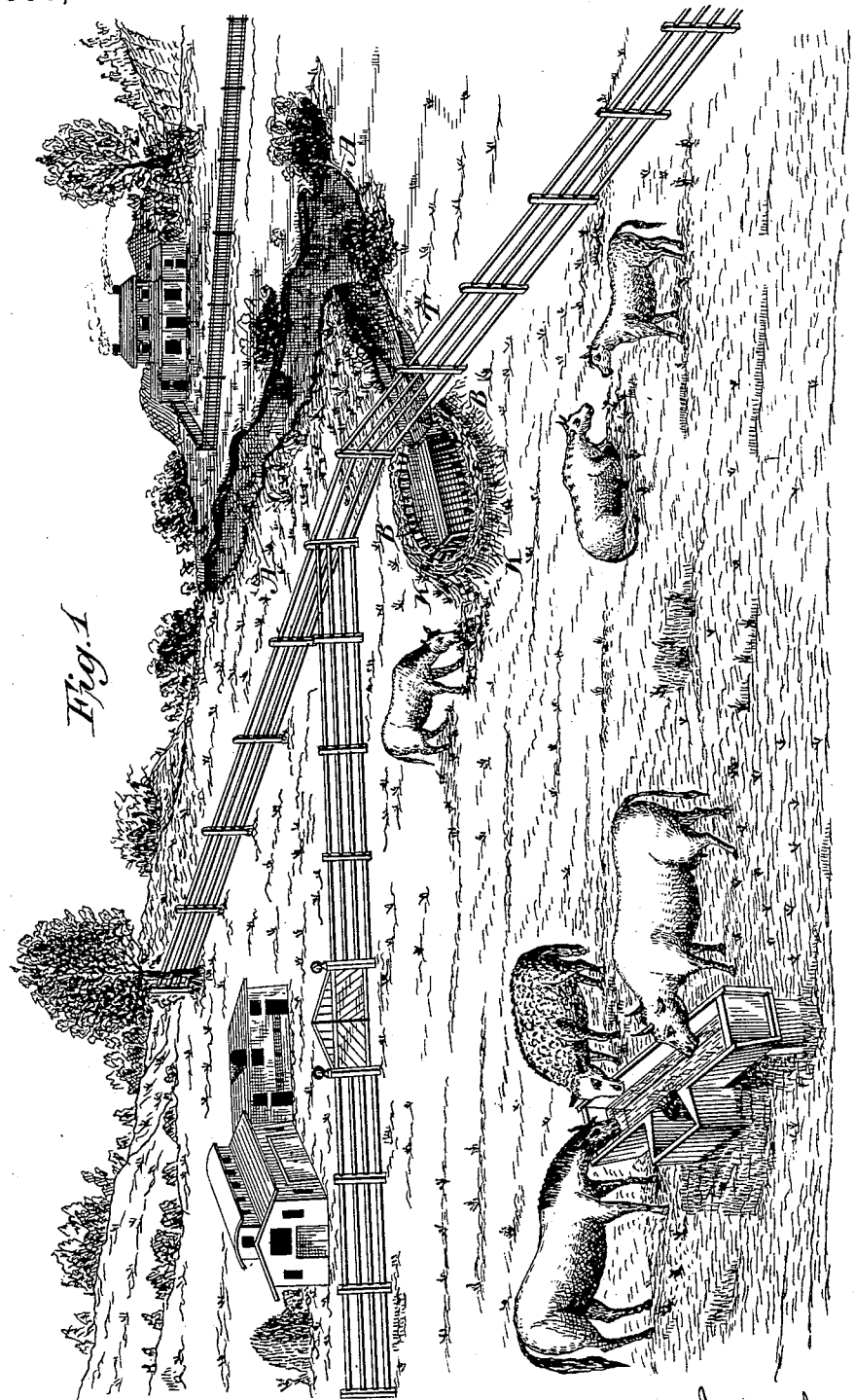

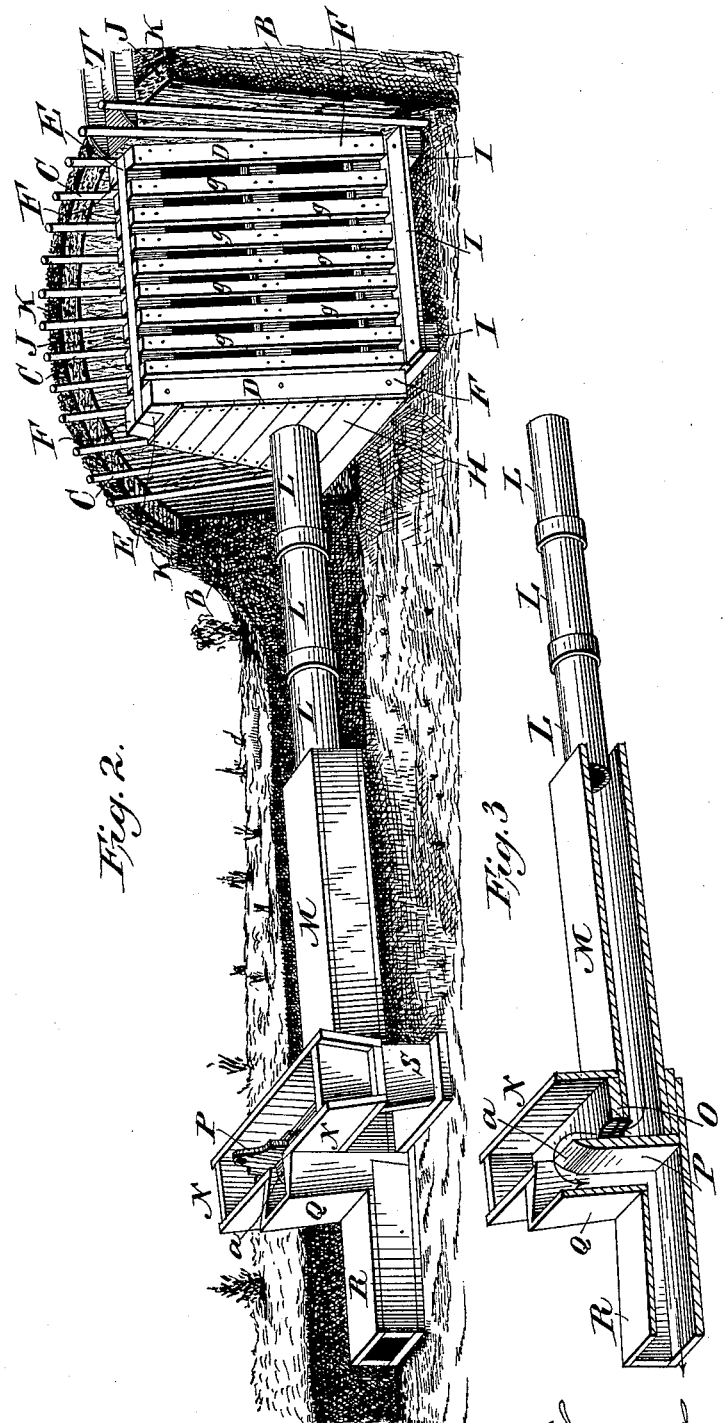

WILLIAM HEATON, OF NEWMAN, ILLINOIS.

DRAINING LANDS, &c.

SPECIFICATION forming part of Letters Patent No. 390,780, dated October 9, 1888.

Application filed November 29, 1887. Serial No. 256,403. (No model.)

*To all whom it may concern:*

Be it known that I, WILLIAM HEATON, a citizen of the United States, residing at Newman, in the county of Douglas and State of Illinois, have invented and made certain new and useful Improvements in the Manner or System of Draining and Reclaiming Lands, preparing the same for proper tillage, and utilizing the drainage-water thereof for the use and benefit of running or grazing live stock, hereby declaring that the following recital is a full, clear, and exact description of the same, reference being had to the accompanying drawings, marked with letters of indication, forming a part of this specification, all of which description will enable others to be skilled in the construction, application, and uses of the same.

Figure 1 is a representation of my invention and improvements, showing the application thereof on farm lands with animals of several kinds standing around a trough or receptacle into and through which the filtered or strained drainage-water is intended to pass, and hence flowing off finally to any required place of deposit. Fig. 2 is a longitudinal perspective view of a reservoir or tank in section, a shield or cage, drain-pipe, trunk, trough, and outlet-connection, from around all of which the earth or soil is partially excavated to show the arrangement of the apparatus employed. Fig. 3 is a longitudinal view of the drain pipe or tile, with trunk and trough connected, one side of which is shown open, to be better understood.

The nature of my invention and improvements is such that natural swamps, bogs, morasses, marshes, or sloughs or overflowed lands can be drained, the excess of water concentrated to one point and drawn off, useless drowned land reclaimed and made useful and suitable for proper tillage, while the surplus drainage can at the same time be utilized for use and benefit of live running stock when grazing, as shown in Fig. 1, where are seen separate fields or tracts of land divided off by a long main line of fence, through one tract of which courses a small stream of water, A A A.

The construction and application of the mechanical appliances employed for the several purposes are as follows, viz: Should there be a dividing fence located, as in Fig. 1, over a stream or through swamp or marsh, then next to, on one side or the other or immediately beneath the line of fencing, the earth or soil must be excavated five or six feet deep by the same width or diameter, more or less, according to the flow and volume of water to be conveyed away, said excavation to be dug out down below the bed surface of the running stream, gully, or gulch, so as to form a sunken reservoir, tank, or water-receptacle, B B, Figs. 1 and 2, the inside circumference to gradually widen from the bottom to top, the side not too perpendicular, so as to prevent the soil from caving in or falling off; and, for better security, long stakes or light piles, C C C C, Fig. 2, may be driven down two inches or more apart, resting flush against the inside, and of sufficient length to hold firmly in the soil and to extend twelve or fourteen inches (more or less) above the top of the reservoir or tank B B, Figs. 1 and 2, thus forming, also, a kind of guard to prevent any trash, débris, or floating rubbish from falling into and choking the reservoir, or there can be a lining of boards.

Within the reservoir B B C C C, Figs. 1 and 2, is arranged a shield or cage-like structure, D D, from three to four feet wide by five or six feet long, cylindrical or square, or, preferably, of a pyramidal shape, as shown, the flooring or base of which must be of stout thick board from one and a half to two inches thick, to bottom of which must be nailed transversely across three or more batten strips of suitable thickness to hold the flooring securely together. (Not shown in drawings.) Next, a suitable strong piece of beam or girder, E E, same length of flooring and from six to eight inches square, two parallel sides thereof beveled off longitudinally from end to end to conform to the pyramidal shape desired. To the flooring and the girder must be framed four stud-timbers, F F F F, three by four inches thick and from five to six feet long, according to the desired height of the shield or cage, said studs to be attached to each side of the flooring and girder, flush and square to the ends thereof, thus forming a skeleton frame, to which, on both sides and one end, are attached securely suitable slats or bars, *g g g g g*, one inch thick and three inches wide, more or less, according to the dimensions of the shield or cage, allowing space between the several slats or bars of two to three inches, as may suit best. To give additional strength to the slats, horizontal brace-strips can be attached on the inside thereof to guard against any excessive pressure of water. One end of the shield or cage must be closely boarded up with stout boarding, as at H, with a suitable circular hole, into which the required drain-tile pipe is to be fitted.

Letters I I I, Fig. 2, mark a suitable framing of four strong strips or rails of timber nailed securely together, the ends of the two longest being nailed on top of the shorter or end rails. Said frame is designed as a base support, on which rests firmly the shield or cage when securely nailed thereto, said framing I I I being wide enough so that the long longitudinal or side rails are entirely on the outside of the shield or cage D D E F $g$ H, Fig. 2; and for greater security, when the shield or cage is arranged properly down within the reservoir or tank B B B additional stakes or pegs may be driven down, bearing flush against the side rails, inclining inwardly toward the shield or cage, thus preventing it from floating out of position.

Having adjusted the shield or cage in proper position, a flat rim or shelf-like space of ground, J J J, must be made entirely around the top of the reservoir or tank B B B, from two to three feet wide, according to volume and flow of water; then outside of said rim, all around its circumference, must be raised a ridge or dam of earth, as at K K, Figs. 1 and 2, intended to hold excess of water and prevent overflowing the surrounding soil, as also to lodge débris, weeds, stalks, or other rubbish, and preventing choking the stakes C C C or falling over into the reservoir.

Immediately under or near to the main line of fencing, Fig. 1, at the outlet of the stream A A, is arranged a plank chute or forebay, T, of required length, depth, and breadth, according to volume or flow of water and nature of the banks of the stream. The outlet end of the chute T can project more or less over the rim J J J, or extend and empty directly over into the reservoir, as in Figs. 1 and 2, provided the chute end has a grating connected therewith, whichever may answer best.

In order to pass the drained water off from the reservoir or tank B B and continue the drainage, the required trench or ditch is excavated, so as to connect the continued drain tile or pipe L L L with the planked end H, Fig. 2, and to any required extent of tile or pipe can be attached a trunk-pipe or penstock, M, of suitable material, made water-tight at joints and of desired dimensions, to one end of which, at right angles across, is attached a water-tight receptacle or trough, N, its bottom resting flush onto the top board of the trunk, through which top and the bottom of the trough a suitable large outlet-hole must be cut, as marked in Fig. 3 at O, and onto the outside front of the trough N, midway its length, must be attached a suitable vertically-arranged downspout, Q. The side next to the trough, as also the upper edge of the trough, must be cut out down from two to four inches, as at $a$ $a$, Figs. 1 and 2, so that the water forcing upwardly into the trough will not run over the sides and waste, but readily pass into and downwardly through the throat P, and off and out through continuation or exit end R, as indicated by the three arrows, Fig. 3.

In Fig. 2 letter S marks a bench-like support for the trough, and whether or not the drainage apparatus is buried to proper depth into the earth the bottom of the trough N must barely escape contact with the surface of earth. The construction of the trough and downspout N O P Q must be in accordance with depth and fall of the drain-tile trench or ditch relative to whatever distance remote the final outflow is discharged; and should there be extended excessive volume of drainage a series or succession of reservoirs and shields at proper intervals apart can be employed, and, if so desired, iron shields or cages can be used instead of wood, for greater strength and durability.

The operation of my improved system of land-drainage is as follows, viz: The volume of water from whatever source—rainfall or other natural flow—through marsh, swamp, bog, morass, slough, or gully courses into and out of the chute T, flowing therefrom into the reservoir or tank B B and shield or cage D D, straining through the bars or grating $g$ $g$ $g$ $g$ $g$, which check and prevent any trash—such as brush, cornstalks, leaves, grass, and other débris—from entering the shield or cage, while the drained water flows also into the drain-tile pipe L L L and trunk M, then by natural pressure passes or rises upwardly into the trough N, falling over the cut-out side $a$ $a$ into and down through the throat P Q, and thence down and out through the end outlet or discharge-trunk, R, as indicated by the arrows, for final disposition.

In situations where there is a running stream through extensive tracts of land with numerous fields, in time of drouth the downspout P Q can have a slide-valve or gate, P′, Fig. 2, so as to cut off the water, and thereby permit it to flow over the trough N and spread over to irrigate any surrounding parched or dry soil, if so desired.

Having shown by suitable diagrams or figures the form, construction, operation, and application of my invention and improvements, describing the purpose and uses thereof, and representing the same in a pictorial-like manner, with stock or animals of various kinds drinking the strained water from a trough or receptacle, thus showing the useful and practical adaptation thereof; being aware of Tobias K. Grube's patent, No. 106,690, issued August 23, 1870, and of John G. Brown's patent, No. 243,501, issued June 28, 1881, and of Richard M. Dill's patent, No. 337,819, issued March 16, 1886, therefore such appliances as therein shown and described I do not claim; but What I do claim as new and useful, and desire to have protected by Letters Patent of the United States, is as follows, viz:

1. In an apparatus for draining land and utilizing the drainage-water thereof, the reservoir or tank-receptacle B B, sunken or dug out below the bed surface of the stream or water-course A A, said reservoir or tank being protected on its interior circumference with fixed stakes or pile-guards C C C C, and also having a flat rim or shelf-like space, J J J J, surrounded by a ridge or dam, K K K K, provided with a convey-chute, T, at outlet of the stream A A, projecting beyond the rim J J J J, so as to conduct the water-flow into the reservoir or tank B B B B, substantially as and for the purposes set forth and described.

2. In an apparatus for draining land and utilizing the drainage-water thereof, the removable portable shield or cage formed of the studs D D F F, beams E E, slats or bars $g\ g$ $g\ g$, closed end H, framing-strips I I I I as a base-support, all arranged or inserted within the reservoir or tank receptacle B B C C J J K K, having a convey-chute, T, communicating with a running stream of water, A A, the whole combined in operation with the connecting tile-pipes L L L, the trunk or penstock M, and the trough appliances N O P P' Q R S $a\ a$, all substantially as and for the purposes set forth and described.

WILLIAM HEATON.

Witnesses:
 R. B. MOFFITT,
 JAS. P. HEATON.